INVENTORS:
Petre Potop
Liviu Brandus
BY Karl G. Ross
Attorney 3,477,205
PROCESS FOR THE SEPARATION OF A GAS
DISSOLVED IN A LIQUID
Petre Potop and Liviu Brandus, Bucharest, Rumania, assignors to Ministerul Industriei Chimice, Bucharest, Rumania, a corporation of Rumania
Filed Mar. 27, 1967, Ser. No. 625,959
Claims priority, application Rumania, Apr. 16, 1966, 51,309
Int. Cl. B01d 19/00
U.S. Cl. 55—53      3 Claims

ABSTRACT OF THE DISCLOSURE

A process for separating a gas from the liquid in which it is dissolved wherein a liquid film flowing in one direction is dispersed by an atomizing gas flowing in the same direction at a velocity of 25 to 100 m./sec. and a volume ratio of liquid to gas of 2.5 to $9.5 \times 10^{-3}$, the atomized liquid being then led through the open space of an unpacked column. At the base of this column, the dispersed particles and carrier gas are subject to a change in direction to separate the gas from the liquid, the gas being recycled in part, if desired, to form the carrier gas.

---

Figure 1:
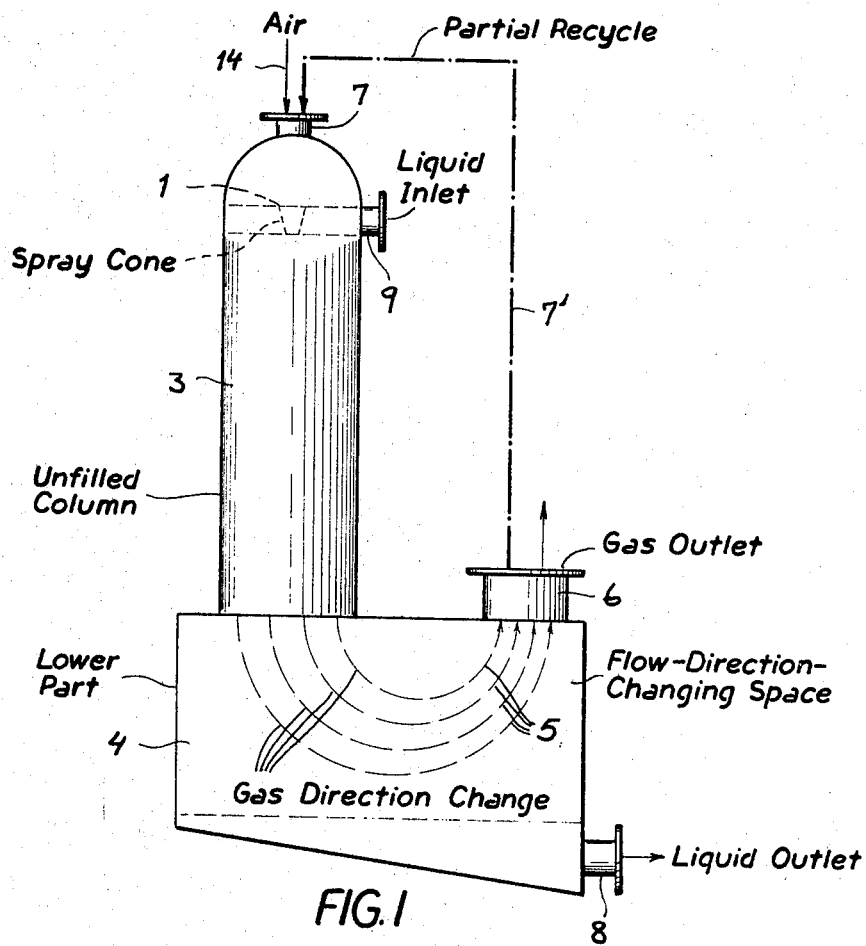

The present invention relates to a process for the separation of a gas from a liquid phase in which the gas is dissolved and especially from solutions producing foam during desorption.

Various methods have been proposed heretofore for the separation of a gas from the liquid phase in which this gas is dissolved, the separation being carried out by heating the solution with or without the application of vacuum and by carryng away the dissolved gas in a stream of another gas insoluble in the liquid. This operation is carried out in flooded or refluxing packed columns; it may also be carried out in distillation columns with bubbling "downcomer" trays into which the cold or heated solution (from which the gas is to be released) is circulated in countercurrent to the insoluble gas for producing a minimum partial pressure of the soluble gas at the contact surface of the liquid film submitted to desorption.

These processes have the disadvantage of a low productivity per unit time and per unit volume of the apparatus used; the productivity is reduced still further in the case in which the process takes place with foam formation. Thus, the desorption of $SO_2$ from an ammonium bisulfite solution treated with phosphoric acid is carried out in stirred and heated reactors, the solution being then transferred into a distillation column over the trays of which air is circulated in countercurrent and entrains the soluble gaseous phase ($SO_2$) developed by the chemical reaction, the reaction taking place with the formation of a rich foam.

The process according to the present invention excludes the above-mentioned disadvantages as it realizes the separation of a gas from the liquid phase in which it is dissolved, and is especially effective with solutions having a tendency to produce foam during the desorption process; the invention involves obtaining a great contact surface by dispersing the liquid phase with a spray-nozzle cone by means of an inert carrier-gas circulated in uniflow at a rate of 25 to 100 m./sec. This inert carrier-gas introduces into an unpacked column the gaseous phase separated from the liquid phase this latter gaseous phase being usually separated from the liquid phase by changing the flow direction into the separating vessel.

According to the character of the gas dissolved in the liquid phase and of the liquid, for obtaining a high desorption, we operate with a volume ratio of liquid:gas of $2.5 \times 10^{-3}$ to $9.5 \times 10^{-3}$ at which, by obtaining a very great contact surface between the liquid drops and the gas carrier-gas, one can obtain an almost instantaneous desorption of the dissolved gas which passes into the gaseous phase.

The process according to the present invention allows enrichment of the carried-gas with the gaseous component desorbed from the liquid phase by recycling a part of the gas mixture after separating it from the liquid phase.

Figure 2:
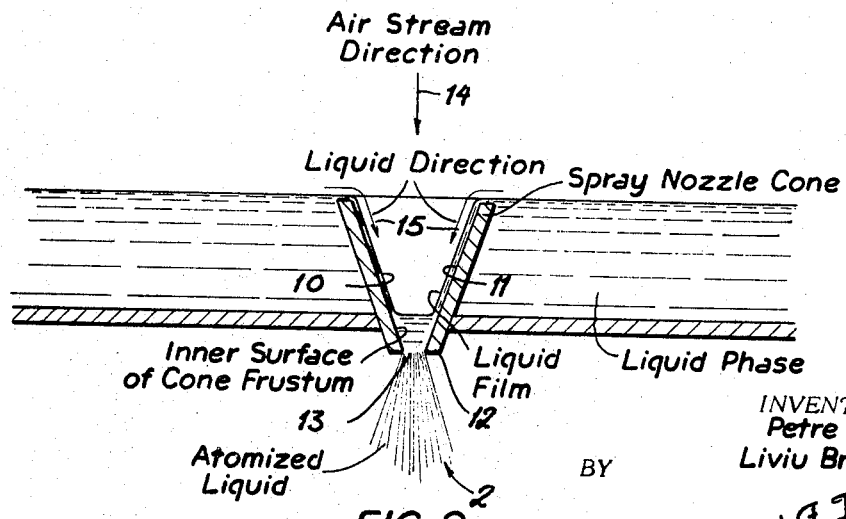

The above and other objects, features and advantages of the present invention will be more readily apparent from the following description, reference being made to the accompanying drawing in which:

FIG. 1 is an elevational view of an apparatus for the separation of gas from a liquid phase according to the present invention; and FIG. 2 is a diagrammatic cross-sectional detail through the spray-nozzle cone.

In the drawing, we show an apparatus which comprises a spray-nozzle cone 1 from which atomized liquid 2 (FIG. 2) is introduced into an unpacked column 3. The separation of the solution and gas phase takes place at the lower part of the column in a space 4 or separating vessel in which the flow direction is changed (arrows 5). From the gas outlet 6, a part may be recycled as represented by line 7' to join the atomizing gas at the inlet 7. The liquid is removed at 8.

As can be seen from FIG. 2, the liquid phase, introduced at 9, passes in the form of a film 10 on the inner surface 11 of a cone frustum 12 whose minor base 13 is oriented downwardly. An air stream from inlet 7 atomizes the liquid of this film. The air stream flows in the direction of arrow 14 while the liquid film follows the direction of arrows 15 so that, in the atomizing nozzle, they flow in the same direction, i.e. in uniflow.

Two examples of the process according to the present invention, as used in the separation of $SO_2$ from an ammonium bisulfite solution treated with phosphoric acid, are given below:

Example 1

An ammonium bisulfite solution containing 400 gr./l. of $SO_2$ and 150 gr./l. of $NH_3$ heated at 95° C. is mixed with phosphoric acid containing 50% $P_2O_5$ and then atomized through a spray-nozzle cone similar to the one conventionally applied in an apparatus for $SO_2$ absorption with diluted gases. The liquid, flowing in the form of a film on the inner surface of the cone frustrum (its minor base facing downwardly), is atomized in the atomizing cone by means of an air stream circulating at a rate of 75 to 100 m./sec., the volumetric ratio of the used liquid:gas being $4.5 \times 10^{-3}$.

The atomized air and liquid pass into an unfilled desorption column, the rate of flow of the mixture being 15 m./sec., the contact or residence time being about 0.005 sec. The separation of the solution and gas phase takes place at the lower part of the column usually in a space where, by changing the flow direction, one obtains a reduction of the gas-flow rate to 0.5 m./sec. After desorption, the solution contains still 0.5 gr./l. of $SO_2$ the productivity of the desorption proces being about 500,000 kg./m.³/hr. of $SO_2$; during the process no foam is produced. The outlet gas contains 18% $SO_2$ by volume.

Example 2

The same conditions as in Example 1 are used with the difference that one-half of the gas volume separated by desorption was recycled for atomizing the ammonium bisulfite solution mixed with phosphoric acid. After phase equilibrium, the obtained gases contained about 25% $SO_2$ by volume.

The process according to the present invention presents the following advantages, the desorption of the gas dissolved in solution is nearly complete, the productivity is very high, and during the process no foam is produced; the desorption process is carried out in low-volume installations by realizing a great contact surface of the gas carrier and the liquid containing the dissolved gas, the contact time being very short; as the process is carried out in an unpacked column, the desorption of a gas may be achieved even in suspension without danger of blockage; by applying recycled gases for atomization, it is possible to obtain gases with a higher concentration of the gaseous component separated from the liquid phase.

What is claimed is:

1. A process for recovering a dissolved gas from a liquid containing same, comprising the steps of:
    (a) passing the liquid containing the dissolved gas in a thin film along an atomizing surface in one direction and directing a stream of atomizing gas generally in said direction and against said film to produce a dispersion of atomized particles of liquid, said atomizing gas flowing at a rate of about 25 to 100 m./sec.;
    (b) introducing the dispersed atomized liquid particles of step a and said atomizing gas into the open space of an unpacked column and entraining said particles with said atomizing gas along said column; and
    (c) subjecting the atomizing gas and particles entrained thereby to a change in direction upon passage thereof through said column to accumulate liquid stripped of the gas dissolved therein and recovering the latter with said atomizing gas upon said change in direction.

2. The method defined in claim 1 wherein the liquid/atomizing gas volume ratio in step (a) ranges between 2.5 and $9 \times 10^{-3}$.

3. The method defined in claim 2 wherein said velocity of said atomizing gas in step (a) is 75 to 100 m./sec. and the liquid/atomizing gas volume ratio in step (a) ranges between 3.5 and $4.5 \times 10^{-3}$, said method further comprising the step of recycling part of the recovered atomizing gas from step (c) to step (a) as part of the atomizing gas used to treat the liquid film.

References Cited

UNITED STATES PATENTS

| 2,720,280 | 10/1955 | Doyle | 55—47 |
| 3,085,793 | 4/1963 | Pike et al. | 261—112 |
| 3,112,352 | 11/1963 | Krantz | 261—112 X |
| 3,140,244 | 7/1964 | Simek et al. | 55—53 X |

FOREIGN PATENTS

| 932,297 | 7/1963 | Great Britain. |

REUBEN FRIEDMAN, Primary Examiner

R. W. BURKS, Assistant Examiner